(12) United States Patent
Khemani et al.

(10) Patent No.: US 10,819,829 B2
(45) Date of Patent: Oct. 27, 2020

(54) METHODS AND SYSTEMS FOR FACILITATING A CLIENT-SERVER COMMUNICATION USING CYCLIC TOKENS

(71) Applicant: Mastercard International Incorporated, Purchase, NY (US)

(72) Inventors: Girish Ramesh Khemani, Pune (IN); Vickhram Sanap, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 16/526,422

(22) Filed: Jul. 30, 2019

(65) Prior Publication Data

US 2020/0045140 A1    Feb. 6, 2020

(30) Foreign Application Priority Data

Aug. 2, 2018   (SG) .......................... 10201806604W

(51) Int. Cl.
    *H04L 29/06*   (2006.01)
    *H04L 29/08*   (2006.01)
(52) U.S. Cl.
    CPC .......... *H04L 67/42* (2013.01); *H04L 63/0807* (2013.01); *H04L 63/0876* (2013.01); *H04L 67/147* (2013.01)
(58) Field of Classification Search
    CPC ... H04L 63/062; H04L 63/10; H04L 63/0807; H04L 63/0876; H04L 67/141; H04L 67/147; H04L 67/42; H04L 9/3247
    (Continued)

(56) References Cited

U.S. PATENT DOCUMENTS 9,430,655 B1 *   8/2016   Stockton ............... H04L 9/3066
2014/0115724 A1 *   4/2014   van Brandenburg ... G06F 21/10
                                                                        726/30
(Continued)

FOREIGN PATENT DOCUMENTS

CN    101291225 A   * 10/2008
JP    2000082045       3/2000
(Continued)

OTHER PUBLICATIONS

PCT International Search Report and Written Opinion from PCT Application No. PCT/US2019/039698 entitled Methods and Systems for Facilitating a Client-Server Communication Using Cyclic Tokens (dated Oct. 18, 2019).

*Primary Examiner* — Ruolei Zong
(74) *Attorney, Agent, or Firm* — Hovey Williams LLP

(57) ABSTRACT

Embodiments provides a method for facilitating a client-server communication using cyclic tokens. The method includes receiving a request for token generation from a client device, generating a token in response to the request for token generation, and sending the token and a number of sub-tokens to be formed from the token to client device. The method includes establishing a cyclic token by token server for client device, where establishing includes generating a plurality of sub-tokens from the token based on the number of sub-tokens. Method further includes sending the plurality of sub-tokens of token to client device in an order defined by a sequence, and recording the plurality of sub-tokens in an order defined by the sequence as cyclic token. The method further includes facilitating validation of cyclic token upon receipt of sub-tokens in order of sequence as part of token validation request from an application server for client device.

20 Claims, 10 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2014/0279554 A1 | 9/2014 | Priebatsch et al. | |
| 2016/0094530 A1* | 3/2016 | Mihaylov | H04L 63/0807 |
| | | | 726/7 |
| 2017/0223005 A1* | 8/2017 | Birgisson | H04L 63/0807 |
| 2017/0337549 A1* | 11/2017 | Wong | G06F 21/6254 |
| 2019/0095607 A1* | 3/2019 | Howard | G06F 21/41 |

FOREIGN PATENT DOCUMENTS

| | | |
|---|---|---|
| JP | 2000330941 | 11/2000 |
| JP | 2008276602 | 11/2008 |
| WO | 2017093597 | 6/2017 |

* cited by examiner

METHODS AND SYSTEMS FOR FACILITATING A CLIENT-SERVER COMMUNICATION USING CYCLIC TOKENS

CROSS REFERENCE TO RELATED APPLICATIONS

This application claims priority to Singaporean Application Serial No. 10201806604 W, filed Aug. 2, 2018, which is incorporated herein by reference in its entirety

TECHNICAL FIELD

The present disclosure relates to a client-server architecture and, more particularly to, methods and systems for implementing secure client-server communication.

BACKGROUND

In a typical client-server architecture, clients and servers exchange messages in a request and response pattern. For example, the client sends a request, and the server returns a response or vice versa. To communicate, client systems and server systems should have a common language, and they must communicate by following certain rules so that both the client and the server know what to expect in the communication. The language and rules of communication are normally defined in a communications protocol.

In a client-server communication, a server may verify or authenticate a client system or a user of the client system for passing sensitive information to the client system based on a request from the client system. For instance, in a payment transaction, using a mobile or a desktop application, where the mobile application is the client and an application server is the server, the server needs to verify and authenticate the application or a user who accesses the application for preventing fraudulent payment transactions and for avoiding security breaches. Verification or authentication may be performed using access tokens. An access token contains security credentials for a login session, and the access token is used to identify a client/user, and/or even a particular application. The primary purpose of the access token is to inform via the Application Programming Interface (API) that the holder of the access token has been authorized to access the API and perform actions supported by the application.

Currently in client-server communications, same access tokens are used in every subsequent API calls/requests made to the server by the client till the token expires. During that period, an unauthorized source can hack into the network and can intercept the token and use the sensitive information in fraudulent activities. This can, however, be overcome using ephemeral tokens. In case of ephemeral tokens, a new token may be generated for every subsequent API call, which may mitigate the risk associated with unauthorized sources hacking and misusing the token. However, the implementation of the ephemeral token is expensive.

Hence, in light of the foregoing discussion, techniques are needed for mitigating the risks associated with hacking and misusing of access tokens, while also avoiding the overhead of generating ephemeral tokens.

SUMMARY

Various example embodiments of the present disclosure provide methods, systems, user devices and computer program products for facilitating a client-server communication using access tokens which are cyclic in nature. Various embodiments provide a token server for generating cyclic tokens including sub-tokens, where each sub-token is associated with an index. The cyclic token is generated for a client device using handshake messaging exchange, wherein the cyclic token includes a plurality of sub-tokens arranged in a particular order. The client device can make API calls using the sub-tokens of the cyclic token in a sequential and cyclic manner.

An embodiment provides a method for facilitating a client-server communication using cyclic tokens. The method includes receiving, by a token server, a request for token generation from a client device. The method further includes generating a token in response to the request for token generation. The method further includes sending, the token and a number of sub-tokens to be formed from the token, by the token server to the client device. Thereafter, the method includes establishing a cyclic token by the token server for the client device, wherein establishing includes generating a plurality of sub-tokens from the token based on the number of sub-tokens. Each sub-token of the plurality of sub-tokens is associated with an index within the token. The method further includes sending a first sequence of indices of sub-tokens to the client device in a first sequential manner, the first sequence of indices defined at the token server. The method further includes receiving a second sequence of indices of sub-tokens from the client device in a second sequential manner, the second sequence of indices defined at the client device. The method further includes sending the plurality of sub-tokens of the token to the client device in an order defined by the second sequence, and recording the plurality of sub-tokens in an order defined by the second sequential manner as the cyclic token. The method further includes facilitating validation of the cyclic token upon receipt of a token validation request from an application server for an Application Programming Interface (API) call of the client device to the application server based at least on the plurality of sub-tokens in the second sequential manner.

Another embodiment provides a token server for facilitating a client-server communication using access tokens. The token server includes a memory comprising stored instructions and a processor. The processor is configured to execute the stored instructions and thereby cause the token server to perform a method which includes receiving, a request for token generation from a client device. The method further includes generating a token in response to the request for token generation. The method further includes sending, the token and a number of sub-tokens to be formed from the token, to the client device. The method further includes establishing a cyclic token for the client device, wherein establishing includes generating a plurality of sub-tokens from the token based on the number of sub-tokens. Each sub-token of the plurality of sub-tokens is associated with an index within the token. The method further includes sending a first sequence of indices of sub-tokens to the client device in a first sequential manner, the first sequence of indices defined at the token server. The method further includes receiving a second sequence of indices of sub-tokens from the client device in a second sequential manner, the second sequence of indices defined at the client device. The method further includes sending the plurality of sub-tokens of the token to the client device in an order defined by the second sequence, and recording the plurality of sub-tokens in an order defined by the second sequential manner as the cyclic token. The method further includes facilitating validation of the cyclic token upon receipt of a token validation request from an application server for an Application Programming Interface (API) call of the client device to the application server based at least on the plurality of sub-tokens in the second sequential manner.

Another embodiment provides a method for facilitating a client-server communication using access tokens. The method includes generating, by a token server, a cyclic token for a client device. The cyclic token includes a plurality of sub-tokens. The method further includes storing, at a token server, a sequence of sub-tokens among the plurality of sub-tokens of the cyclic token for the client device. The sequence of sub-tokens is received from the client device. The method further includes receiving a token validation request from an application server. The token validation request is received in response to an Application Programming Interface (API) call of the client device to the application server. The token validation request includes a sub-token and an index associated with the sub-token within the plurality of sub-tokens received from the client device as part of the API call. The method further includes validating the sub-token if each of the sub-token and the index conform to the cyclic token and the sequence of sub-tokens of the cyclic token, respectively.

BRIEF DESCRIPTION OF THE FIGURES

For a more complete understanding of example embodiments of the present technology, reference is now made to the following descriptions taken in connection with the accompanying drawings in which.

Figure 1:
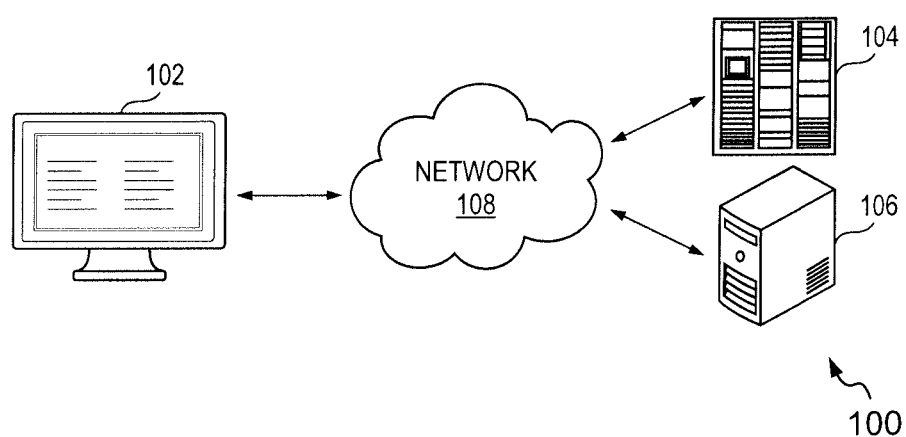
FIG. 1 is an illustration of an example environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices and computer program products for facilitating a client-server communication using access tokens which are cyclic in nature. Various embodiments provide a server for generating a cyclic token for a client device, where the cyclic token includes a plurality of sub-tokens arranged in a particular sequence defined by the client device, where each sub-token is associated with an index within the cyclic token. Further, various embodiments provide methods for generating the cyclic token and utilizing the cyclic token to authenticate the client device in API calls associated with applications accessed by the client device.

In various example embodiments, the present disclosure describes a token server, an application on a client device and an application server. The client device and the application server exchange information through the application. The application, as an example, may be a payment transaction application. Prior to exchange of information between the application and the application server, the client device requests the token server for generating a token by sending a request for token generation. The request for token generation includes information such as a client ID and other client authentication information including but not limited to password, PIN, etc. In response to the request for token generation, the token server generates a token and shares the token with the client device. The token server and the client device also agree about a number of sub-tokens to be formed from the token for forming a cyclic token. Each sub-token that can be formed from the token has an associated index. The sharing of token and agreeing on the number of sub-tokens to be formed from the token can be performed at different time instants or in different sessions. For example, the client device agrees on the number of sub-tokens and sends an approval to the token server in an offline manner. The token server generates a plurality of sub-tokens by breaking the token, wherein each sub-token of the plurality of sub-tokens is associated with an index. The client device may also generate the plurality of sub-tokens by breaking the token, wherein each sub-token of the plurality of sub-tokens is associated with an index. The number of sub-tokens generated on both sides (i.e. the token server and the client device) is equal to the number agreed upon by the client device and the token server.

The token server, subsequently, generates a first sequence of indices of the sub-tokens (also termed as 'server sub-token sequence'). As an example, if a token is generated as 'ABCDEFGHI', and if the number of sub-tokens to be formed from the token is 3 such as 'ABC', 'DEF' and 'GHI', then 3 indices e.g., T1, T2 and T3 are defined, wherein T1 is associated with 'ABC', T2 is associated with 'DEF' and T3 is associated with 'GHI'. An example of the first sequence of indices may be T1T2T3. The token server then sends the indices of the first sequence to the client device in a first sequential manner. The client device generates a second sequence of indices of sub-tokens (also termed as 'client sub-token sequence'). The second sequence of indices generated at the client device may be similar to or different from the first sequence of indices. An example of the second sequence of indices may be T3T1T2. The client device sends the indices of the sub-tokens in a second sequential manner in response to the token server sending the indices to the client device in the first sequential manner. The token server records the second sequence of indices (i.e. client sub-token sequence) to define a cyclic token for the client device. For instance, the cyclic token for the client device is recorded as an ensemble of a plurality of sub-tokens in an order defined by the second sequential manner.

During one or more API calls by the client device to the application server, the client device sends the indices associated with the sub-token and corresponding sub-tokens as per the order defined by the second sequential manner (i.e. as per the second sequence). For example, if the cyclic token includes the sub-tokens in an order of a sub-token with index T3, a sub-token with index T1 and a sub-token with index T2, the client device consumes (i.e. sends) the sub-token with index T3 for the first API call, the sub-token with index T1 for the second API call, and the sub-token with index T2 for the third API call. If the API calls are more than three in the current API session between the client device and the application server, the client device utilizes the cyclic nature of the cyclic token. For example, the client device consumes the sub-token with index T3 for the fourth API call, the sub-token with index T1 for the fifth API call, the sub-token with index T2 for the sixth API call, the sub-token with index T3 for the seventh API call, and so on.

The application server sends the indices received from the client device and corresponding sub-tokens to the token server for validation of the API calls. Since, the token server has already recorded the second sequence (i.e. client sub-token sequence), the token server verifies the order of receipt of sub-tokens of the cyclic token from the application server.

Hence, the sequence of the sub-tokens sent by the client device gets validated against the client sub-token sequence maintained at the token server. If there is any mismatch between the order of sub-tokens received from the client device (e.g., received at the token server from the application server on behalf of the client device) and the client sub-token sequence maintained at the token server, validation of the API call is failed.

In entire communication, the client device does not share the complete list of sub-token indices (i.e. the client sub-token sequence) with the token server or with the application server over a single API call, thereby making the token sharing process difficult to intercept. Moreover, the complexity and level of security imposed by proposed disclosure increases as the number of sub-tokens to be formed from the token increases. Various example embodiments of the present disclosure are herein explained with respect to FIG. 1 to FIG. 11.

FIG. 1 illustrates an exemplary representation of an environment 100, in which at least some example embodiments of the present disclosure can be implemented. In the illustrated environment 100, a client device 102 is illustrated. The client device 102 is seen to be in operative communication with a token server 104 and an application server 106 via a network 108. In some cases, the token server 104 and the application server 106 can be a single entity i.e. embodied within a single server system. The token server 104 and the application server 106 can be examples of logical servers built on cloud computing platform. Alternatively, these servers can be physical servers located at facilities of entities managing these servers.

In an embodiment, the application server 106 hosts an application to be used by various users. Some non-exhaustive examples of the application include a payment transaction application, an authentication application, a loyalty program application, a digital wallet application and an e-commerce application. The API and other components of the application rest on the application server 106. The application can be made available at application stores such as Google playstore managed by Google®, Apple App store managed by Apple®, etc. The application can be downloaded from the application stores, or from other sources such as web links and storage locations, to devices such as the client device 102. The application is a set of computer executable codes configured to perform functions inherently configured in the application. The set of computer executable codes may be stored in a non-transitory computer-readable medium of the client device 102 so as to access the application from the application server 106. The application installed on the client device 102 facilitates an application interface (not shown in FIG. 1) on the client device 102 to enable communication with the application server 106.

The application, as an example, may be a payment transaction application. It shall be noted that accessing the payment transaction application may redirect the client device 102 to establish a connection/session with the token server 104 for generation of the cyclic token for the client device 102 by the token server 104. The cyclic token includes a plurality of sub-tokens in an order defined by the second sequence of indices of sub-tokens (i.e. second sequential manner). Upon successful generation of cyclic tokens (i.e. tokens segmented into sub-tokens in the order defined by the second sequential manner), an API session is initiated between the application server 106 and the client device 102 for authentication of the client device 102 (or a user of the client device 102), and payment transaction related information can be exchanged upon authentication.

In another embodiment, there may be a separate token generation and validation application hosted by the token server 104, which can be accessed by the client device 102. The client device 102 and the token server 104 may communicate via the token generation and validation application to generate the cyclic token for the client device 102. In this embodiment, the client device 102 can directly generate the cyclic token by contacting the token server 104, and then can use the cyclic token for API calls with the application server 106.

Examples of the client device 102 include, but are not limited to, a smartphone, a tablet, a personal digital assistant (PDA), a notebook, etc. As an example, the client device 102 of FIG. 1 is depicted as a desktop computer, however, the client device 102 can include any electronic device having the capability to allow installation of third party applications and communicate with other devices via the network 108.

The application server 106 can take example of any server which requires authentication of a user communicating with the application server 106 via a digital token. In an example, the application server 106 may be associated with a financial institution such as an "issuer bank" or "issuing bank" or simply "issuer" or simply "bank", in which a user operating the client device 102 may have an issuer account. The application server 106 is responsible for managing information of the user. The application server 106 includes an issuer database (not shown) for maintaining information such as one or more issuer accounts of the user, transaction history related information, permanent account number (PAN) with which the one or more issuer accounts are linked, etc. Additionally or alternatively, the application server 106 may be associated with a merchant or a Point of Sale (POS) system network. For example, the application server 106 may be associated with an "acquirer bank" or "acquiring bank" or simply "acquirer", in which a user operating the client device 102 may have an acquirer account. Additional non-limiting examples of the application server 106 may be a digital wallet server and an authentication server.

Some non-exhaustive examples of the token server 104 includes a payment server managed by payment cards issuing authorities and/or a payment server associated with a payment interchange network (not shown). Examples of payment interchange network include, but are not limited to, Mastercard® payment system interchange network. The Mastercard® payment system interchange network is a proprietary communications standard promulgated by Mastercard® International Incorporated for the exchange of financial transaction data between financial institutions that are members of Mastercard® International Incorporated. (Mastercard is a registered trademark of Mastercard International Incorporated located in Purchase, N.Y.). Additionally, the application server 106 may be associated with a financial institution, merchant or a POS system network.

In another example, the application server 106 and the token server 104 may be managed by the same entity. For example, the application server 106 and the token server 104 may be managed by a financial institution such as an issuer bank, or by a payment interchange network such as Mastercard® payment system interchange network. In another example, both of the application server 106 and the token server 104 may be managed by a merchant, a POS system network or by a digital wallet server.

The client device 102, the application server 106 and the token server 104 may communicate with one another via the communication network 108. The communication network 108 may be a centralized network or may comprise a plurality of sub-networks that may offer a direct communication or may offer indirect communication between the client device 102, the application server 106 and the token server 104. Examples of the communication network 108 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 108 may be or include the Internet, intranets, extranets, microwave networks, satellite communications, cellular systems, personal communication services ("PCS"), infrared communications, global area networks, or other suitable networks, etc., or any combination of two or more such networks.

In an example scenario, if the application is a typical payment transaction application, the client device 102 accesses the application to initiate a payment transaction. As described earlier, it shall be noted that accessing the application may redirect the client device 102 to establish a connection/session with the token server 104 for generation and validation of cyclic token between the token server 104 and the client device 102. This may be the case when the token server 104 and the application server 106 can both be accessed via a single application i.e. a payment transaction application. In an alternate embodiment, the client device 102 may initiate a session with the token server 104 before establishing an API session with the application server 106 via a separate application such as a token generation and validation application.

Figure 2:
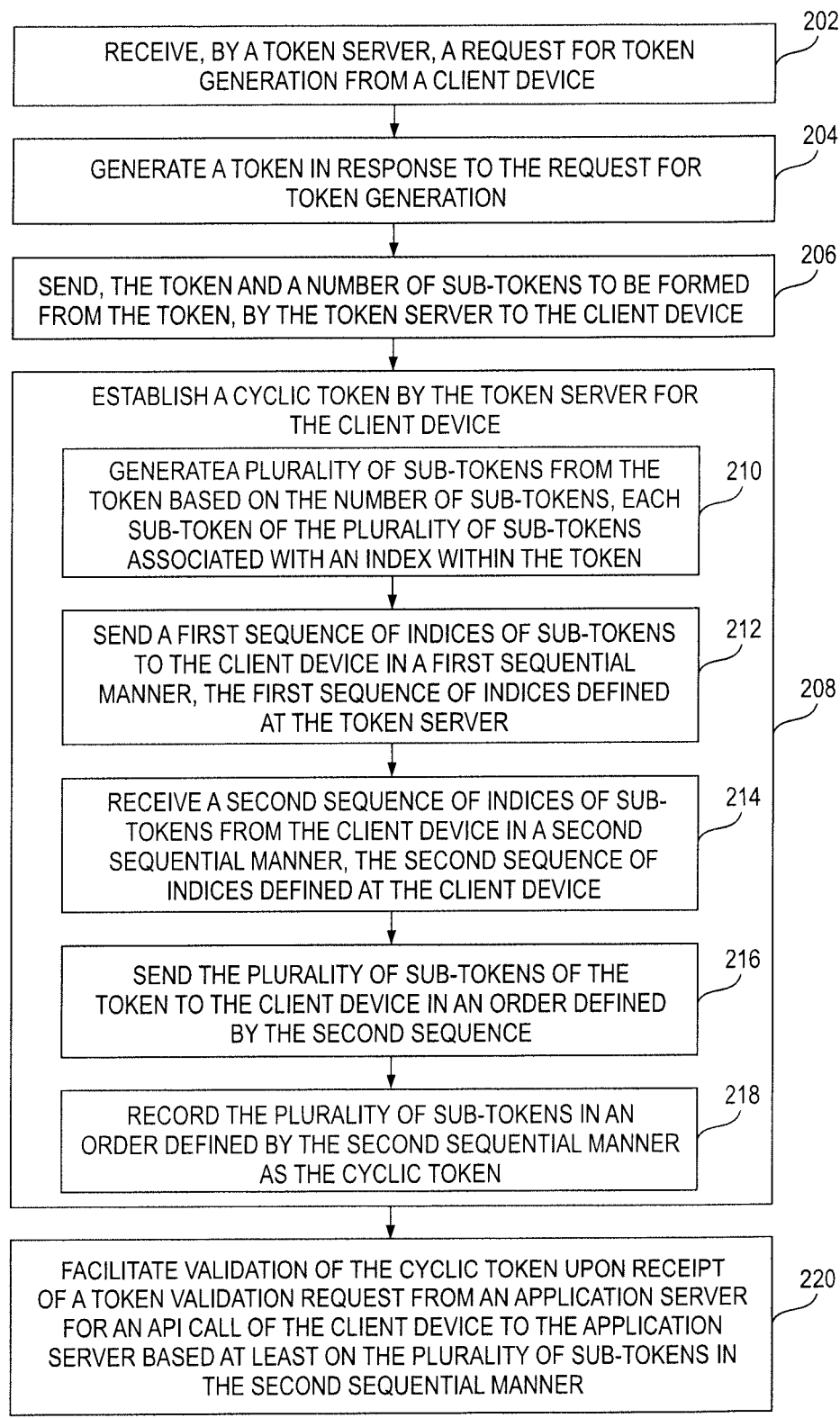
FIG. 2 illustrates a flow diagram of a method for facilitating a client-server communication using cyclic tokens, in accordance with an example embodiment of the present disclosure.

FIG. 2 illustrates a flow diagram of a method 200 for facilitating a client-server communication using cyclic token, in accordance with an example embodiment of the present disclosure. The method 200 depicted in the flow diagram may be executed by, for example, the token server 104. Operations of the flow diagram 200, and combinations of operations in the flow diagram 200, may be implemented by, for example, hardware, firmware, a processor, circuitry and/or a different device associated with the execution of software that includes one or more computer program instructions. The operations of the method 200 are described herein with help of the token server 104. It is noted that the operations of the method 200 can be described and/or practiced by using a system other than the token server 104.

The method 200 starts at operation 202, where the token server 104 receives a request for token generation from a client device such as the client device 102. It shall be noted that accessing the application on the client device 102 by the user, may establish a communication of the client device 102 with the token server 104 before any API calls are made to the application server 106. Alternatively, the client device 102 may directly initiate a token generation session with the token server 104 before any API calls are made by the application on the client device 102 to the application server 106.

At 204, in response to the token generation request, the token server 104 generates a token to be shared with the client device 102. For example, the token server 104 may generate the token as 'ABCDEFGHI'.

At 206, the method 200 includes sending the token and a number of sub-tokens to be formed from the token, by the token server 104 to the client device 102. For example, the token server 104 sends the token 'ABCDEFGHI' and the number of sub-tokens as three, to the client device 102.

At 208, the method 200 includes establishing a cyclic token by the token server 104 for the client device 102. The operation of 208 can be performed by multiple operations 210 to 218. It should be noted that the operations 210 to 218 may not be performed in an order as they are presented, and two or more operations can be performed together. A details explanation of the establishing the cyclic token is explained with reference to FIG. 4.

At 210, the token server 104 generates a plurality of sub-tokens from the token based on the number of sub-tokens. As the number of sub-tokens is three, three sub-tokens are generated from the token. Further, each sub-token is associated with an index within the token. In an example, the token server 104 generates three sub-tokens such as, 'ABC', 'DEF', 'GHI', where the sub-tokens 'ABC', 'DEF' and 'GHI' are associated with indices T1, T2 and T3 respectively. At this instant, the client device 102 also generates three sub-tokens 'ABC', 'DEF', 'GHI' at its end, as the client device 102 is aware of the number of sub-tokens to be formed for the token. Also, the client device 102 is aware of associated index of sub-tokens formed from the token.

At 210, the method 200 also includes generating the first sequence of indices of sub-tokens (i.e. the sever sub-token sequence) by the token server 104. Further, the method 200 also includes facilitating the client device 102 to generate the second sequence of indices of sub-tokens (i.e. the client sub-token sequence). In an example, the server sub-token sequence may be T1T2T3. Likewise, the client device 102 also generates the client sub-token sequence as T3T1T2. The sever sub-token sequence and the client sub-token sequence may be similar or different.

At 212, the method 200 includes sending, by the token server 104, a first sequence of indices of sub-tokens to the client device 102 in a first sequential manner. Herein, the first sequential manner refers to a sequence of handshake signal exchanges in an order defined by the first sequence of indices of sub-tokens. For example, the token server 104 sends index T1 followed by indices T2 and T3 in different handshake operations, to the client device 102.

At 214, the method 200 includes receiving, by the token server 104, a second sequence of indices of sub-tokens from the client device 102 in a second sequential manner. The second sequence of indices is defined at the client device 102 i.e. T3T1T2. Herein, the second sequential manner refers to a sequence of handshake signal exchanges in an order defined by the second sequence of indices of sub-tokens. For example, the client device 102 sends index T3 followed by indices T1 and T2 in different handshake operations, to the token server 104.

At 216, the method 200 further includes sending, by the token server 104, the plurality of sub-tokens of the token to the client device 102 in an order defined by the second sequence. For instance, the token server 104 sends the sub-tokens in the order of the sub-token associated with index T3, the sub-token associated with index T1 and the sub-token associated with index T2. It is noted that each of these sub-tokens is sent in different handshake messages, and is sent in response to receipt of the corresponding index of sub-token from the client device 102. For example, if the client device 102 sends the index T3, the token server 104 responds with the sub-token associated with the index T3, and so on.

At 218, the method 200 includes recording, by the token server 104, the plurality of sub-tokens in an order defined by the second sequential manner as the cyclic token. It should be noted that recording of the sub-tokens is done at multiple time instants as per the receipt of the second sequence of indices of sub-tokens from the client device 102. For example, the token server 104 records the cyclic token as GHI(T3), ABC(T1), DEF(T2).

At 220, the token server 104 facilitates validation of cyclic token upon receipt of a token validation request from an application server such as the application server 106 for an API call of the client device 102 to the application server 106. The validation of the cyclic token is performed based on verifying whether the sub-tokens are received in the order defined by the second sequential manner or not. In a use case, in an API call by the client device 102 to the application server 106, the client device 102 sends the indices associated with the sub-tokens in the second sequential manner, sub-tokens associated with the indices, the client ID and any additional client authentication information to the application server 106. The application server 106 sends the indices received from the client device 102 and corresponding sub-tokens, in an order of receipt, to the token server 104 for validation of API calls. Post successful validation, the application server 106 authenticates and allows transaction with the client device 102 or the application available at the client device 102.

Figure 3:
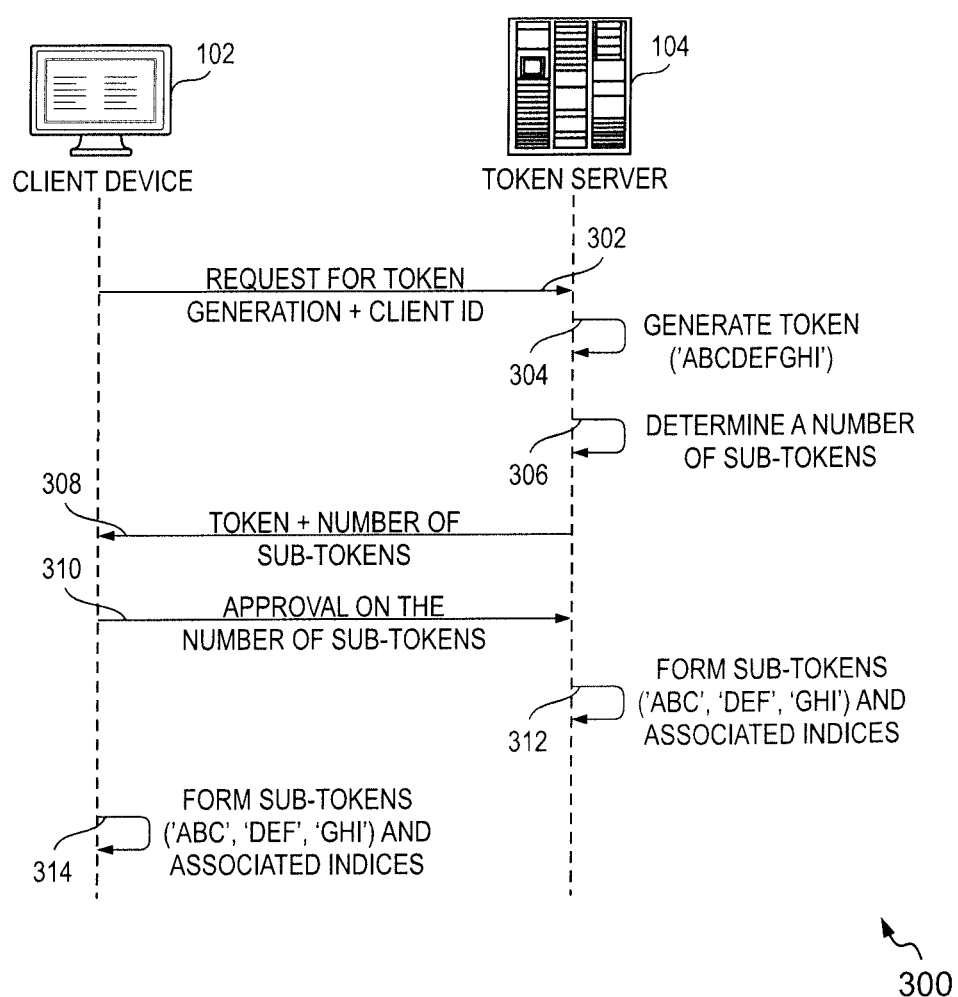
FIG. 3 illustrates a simplified schematic flow diagram of a method of generation of a token and agreeing upon a number of sub-tokens to be formed from a token by the client device and the token server, in accordance with an example embodiment of the present disclosure.

FIG. 3 illustrates a simplified schematic flow diagram 300 representing a method of generation of a token and agreeing upon a number of sub-tokens to be formed from a token by the client device 102 and the token server 104, in accordance with an example embodiment of the present disclosure. It shall be noted that the application on the client device 102 may establish a communication with the token server 104 before any API calls are made to the application server 106. Alternatively, the client device 102 may directly initiate a token generation session with the token server 104 before any API calls are made by the client device 102 to the application server 106 in the application.

At 302, the client device 102 sends a request for token generation (also termed as 'token generation request) to the token server 104. The token generation request may include valid client ID and other client authentication information, which enables the token server 104 to authenticate the client device 102.

At 304, in response to the token generation request, the token server 104 generates a token. In an example, the token server 104 generates a token such as 'ABCDEFGHI' to be shared with the client device 102.

At 306, the token server 104 also determines a number of sub-tokens that should be formed from the token. For instance, the token server 104 may determine that three (3) sub-tokens should be formed from the token. Although, the number of sub-tokens to be generated from a token can be any number greater than 1, however it is generally equal to or greater than three. In an example embodiment, the number of sub-tokens can be initially agreed between the client device 102 and the token server 104, and it need not to be generated only after the generation of the token at 304. For example, the number of sub-tokens can be decided between the client device 102 and the token server 104 in an offline manner, or in a session different than a session in which the token is generated and shared with the client device 102.

At 308, the token server 104 provides the token and the number of sub-tokens to be generated from the token to the client device 102. In an example embodiment, the number of sub-tokens can be shared with the client device 102 in an offline manner. Alternatively, the number of sub-tokens can be shared in a session different than a session in which the token is shared from the token server 104 to the client device 102.

At 310, the client device 102 sends an approval of agreement on the number of sub-tokens to be formed from the token. Upon receipt of the approval, the token server 104 forms the plurality of sub-tokens at 312. The generated token 'ABCDEFGHI' may be broken down into 3 sub-tokens such as, 'ABC', 'DEF', 'GHI' as an example, where each of the sub-tokens 'ABC', 'DEF' and 'GHI' is associated with corresponding index such as T1, T2 and T3 respectively. At 314, the client device 102 also forms the sub-tokens 'ABC', 'DEF', 'GHI' with corresponding indices T1, T2 and T3.

Once the token is generated and shared with the client device 102, the token server 104 and the client device 102 perform a set of handshaking operations to determine sequences of sub-tokens generated from each of the token server 104 and the client device 102, which are explained with reference to FIG. 4.

Figure 4:
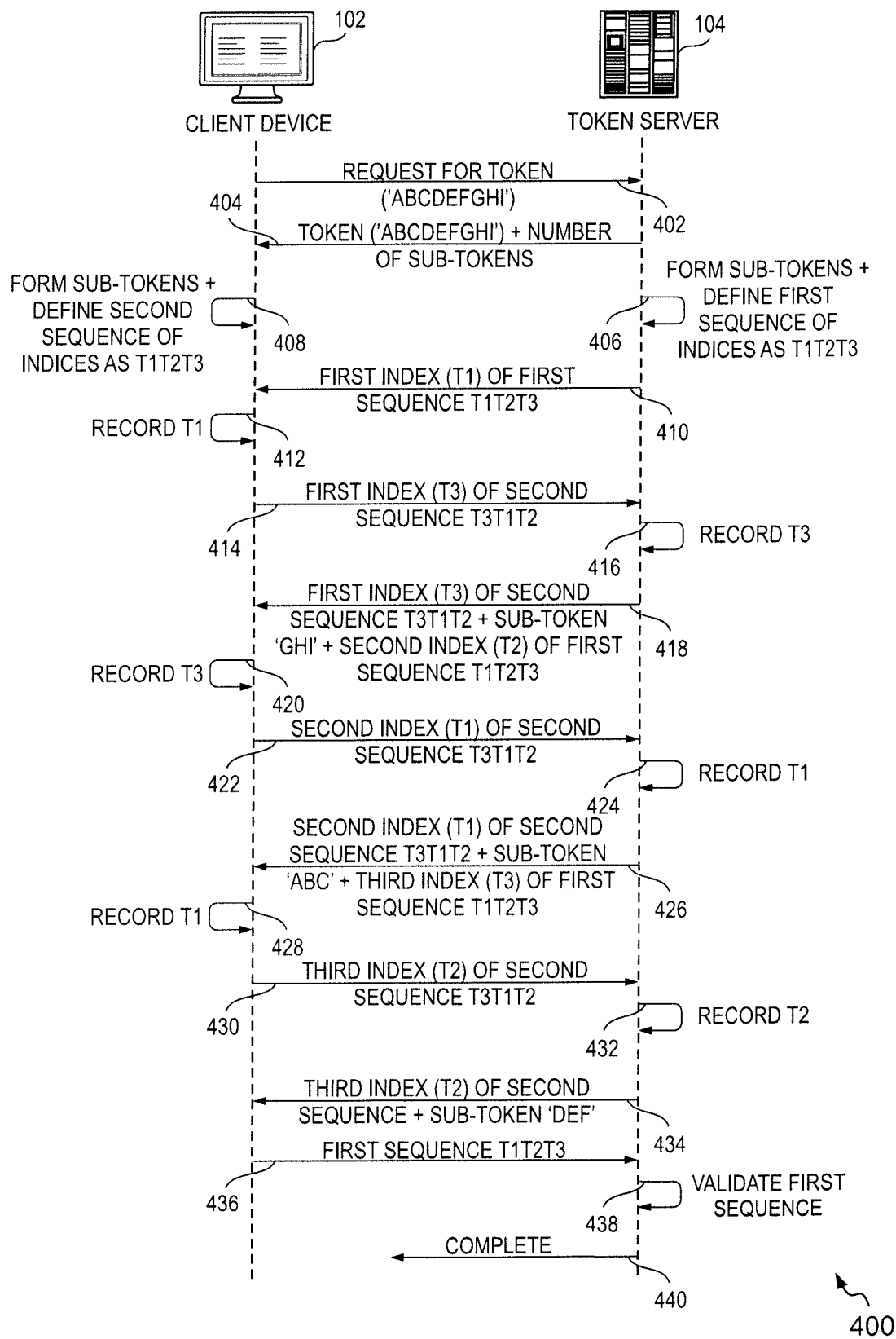
FIG. 4 illustrates a schematic flow diagram representing a method of generation of a cyclic token for enabling a client-server communication, in accordance with an example embodiment of the present disclosure.

Referring now to FIG. 4, a schematic flow diagram 400 representing a method of generation of a cyclic token for enabling a client-server communication, is shown in accordance with an example embodiment of the present disclosure.

At 402, the client device 102 requests for the token to the token server 104. The client device 102 may provide the client ID and other authentication information of the client device 102 to the token server 104 for generating the token.

At 404, in response to the request for token, the token server 104 sends the generated token (e.g., 'ABCDEFGHI'). The token server 104 also sends a number of sub-tokens to be formed from the token. As described with reference to FIG. 3, the number of sub-tokens can be shared between the token server 104 and the client device 102, even before sending the token to the client device 102. In an example, the token server 104 sends the number of sub-tokens as three to the client device 102.

At 406, the token server 104 forms the plurality of sub-tokens from the token, where the plurality of sub-tokens includes the number of sub-tokens agreed between the token server 104 and the client device 102. Also, at 406, the token server 104 defines a first sequence of sub-tokens (i.e., server sub-token sequence). In an example scenario, the token server 104 breaks the token 'ABCDEFGHI' into 3 sub-tokens such as 'ABC', DEF, 'GHI'. It shall be noted that the disclosure does not limit the number of sub-tokens to 3, and the number of sub-tokens can be any number greater than 2. Each of the sub-tokens ('ABC', 'DEF' and 'GHI') is associated with a corresponding index. For instance, the sub-token 'ABC' is associated with index 'T1', the sub-token 'DEF' is associated with index 'T2' and the sub-token 'GHI' is associated with index 'T3'. Accordingly, in this example scenario, the token server 104 generates the first sequence of indices of sub-tokens as T1T2T3. Hence, the first sequence is defined as T1T2T3 at the token server 104.

Likewise, at 408, the client device 102 also forms the plurality of sub-tokens from the token, where the plurality of sub-tokens includes the number of sub-tokens agreed between the token server 104 and the client device 102. For example, the client device 102 breaks the token 'ABCDEFGHI' into 3 sub-tokens such as 'ABC', def, 'GHI'. Also, at 408, the client device 102 defines a second sequence of sub-tokens (i.e. 'client sub-token sequence'). In this example scenario, it is assumed that the token server 104 generates the second sequence of indices of sub-tokens as 'T3T1T2'. Hence, the second sequence is defined as 'T3T1T2' at the client device 102. It is noted that the second sequence may or may not be similar to the first sequence.

The token server 104 and the client device 102 are further engaged into handshake communication to establish the cyclic token for the client device 102, which is performed by operations 410 to 440, as described herein.

At 410, the first index (e.g., T1) of the first sequence 'T1T2T3' (server sub-token sequence) defined at the token server 104 is sent to the client device 102, by the token server 104.

At 412, the client device 102 records the first index T1 of the first sequence T1T2T3 defined at the token server 104.

At 414, the client device 102 sends the first index of second sequence (client sub-token sequence) to the token server 104. For instance, in this example, the client device 102 sends the first index (e.g., T3) of the second sequence 'T3T1T2' to the token server 104.

At 416, the token server 104 records the first index T3 of the second sequence 'T3T1T2' defined at the client device 102. At 418, the token server 104 sends the first index T3 of the second sequence 'T3T1T2' and the sub-token 'GHI' associated with the first index T3. The token server 104 also sends the second index of first sequence T1T2T3 i.e. the index T2.

At 420, the client device 102 records the index T3. At 422, the client device 102 sends the second index T1 of the second sequence 'T3T1T2' defined at the client device 102.

At 424, the token server 104 records the second index T1 of the second sequence 'T3T1T2' defined at the client device 102. At 426, the token server 104 sends the second index T1 of the second sequence 'T3T1T2', the sub-token 'ABC' associated with the second index T 1. The token server 104 also sends the third index i.e. index T3 of the first sequence 'T1T2T3'.

At 428, the client device 102 records the index T1. At 430, the client device 102 sends the third index T2 of the second sequence 'T3T1T2' defined at the client device 102, to the token server 104.

At 432, the token server 104 records the third index T2 of the second sequence 'T3T1T2' defined at the client device 102. At 434, the token server 104 sends the third index T2 of the second sequence 'T3T1T2' and the sub-token 'DEF' associated with the index T2, to the client device 102.

At 436, the client device 102 sends a sequence of indices of sub-tokens as received from the token server 104. For instance, the client device 102 sends the sequence 'T1T2T3' in the order of receipt of the indices to the token server 104 for validation.

At 438, the token server 104 validates the sequence 'T1T2T3' by matching the sequence with the first sequence to ascertain if the client device 102 has correctly recorded the first sequence of indices of sub-tokens in the first sequential manner. The token server 104 may send an affirmative response such as 'Ok' or 'Yes' upon successful validation. At 440, the process of token generation, sub-token generation and sub-token validation is completed. In this manner, the cyclic token including the plurality of sub-tokens i.e. 3 sub-tokens are generated and recorded in the token server 104 for the client device 102. The token server 104 is now aware of sequence of the sub-tokens in the cyclic token generated for the client device 102 i.e. the second sequence 'T3T1T2'.

Herein, it should be noted that the cyclic token is recorded as the plurality of sub-tokens in an order defined by the second sequential manner (i.e., order of receipt of the second sequence of indices of sub-tokens). For instance, the token server 104 records the sub-tokens GHI, ABC, DEF which are received and recorded as per the order of T3, T1, T2 (i.e. an example of the second sequential manner, shown by steps 416, 424, 432, respectively).

The token server 104 is configured to facilitate validation of the cyclic token when the token server 104 receives a token validation request from an application server for an API call of the client device 102. For example, the token server 104 checks whether the sub-tokens are received from the application server 106 in the second sequential manner or not, and based on such checking, the token server 104 processes the token validation request. An example explanation of the validation of the cyclic token is further provided herein with reference to FIG. 5.

Figure 5:
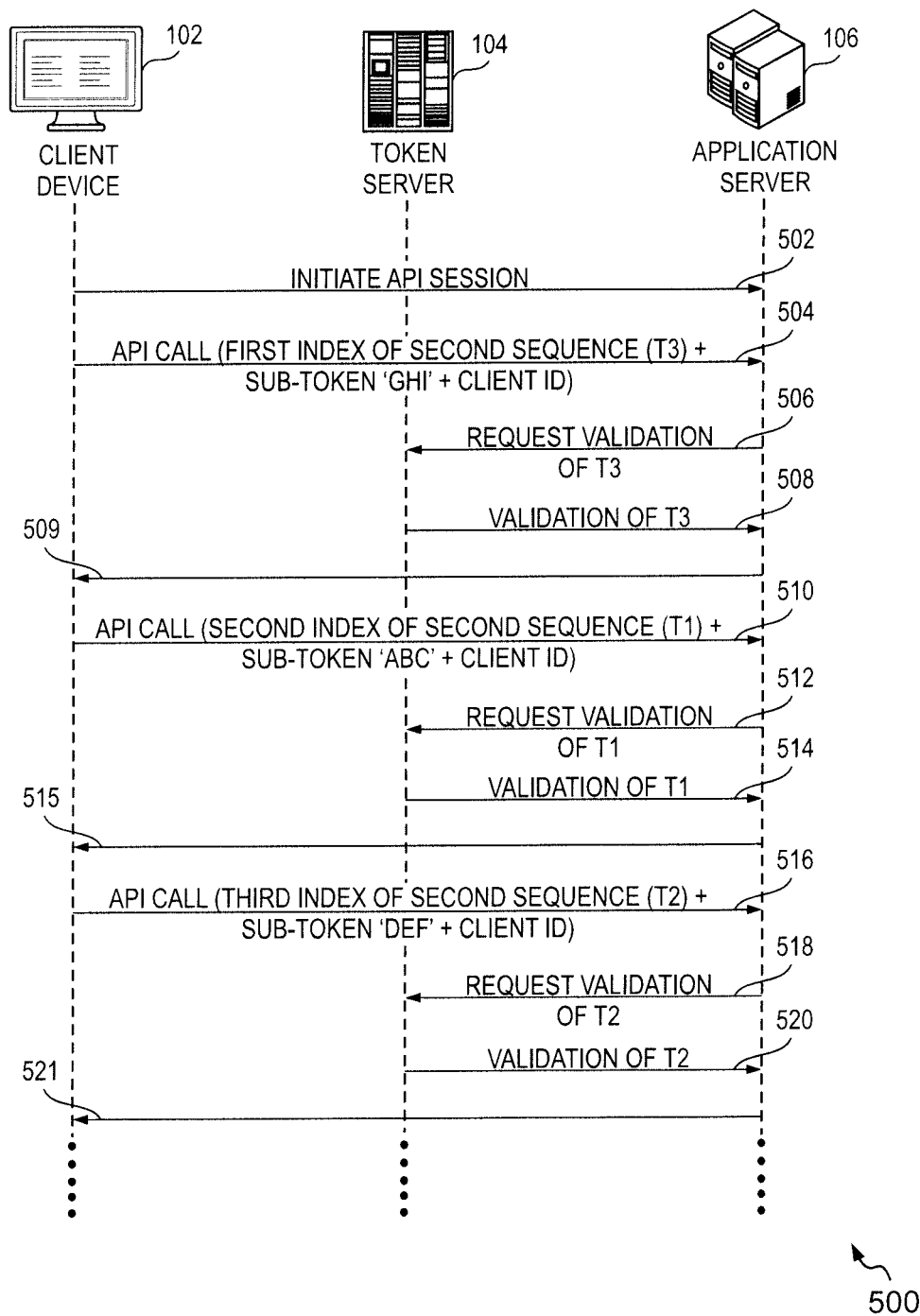
FIG. 5 illustrates a schematic flow diagram representing a method of facilitating a client-server communication using cyclic tokens, in accordance with an example embodiment of the present disclosure.

FIG. 5 illustrates a schematic flow diagram 500 representing a method of facilitating a client-server communication using cyclic token, in accordance with an example embodiment of the present disclosure. The client device 102 (e.g., an application present in the client device 102) makes API call to the application server 106. The application server 106 authenticates the client device 102 based on the sub-tokens of the cyclic token. More specifically, the application server 106 authenticates the client device 102 by validating a sequence of indices of the sub-tokens received from the client device 102 with the second sequence of indices of the sub-tokens (i.e. client sub-token sequence) maintained at the token server 104. It shall be noted that there may be a plurality of API calls and responses for their validations in a cyclic manner between the client device 102 and the application server 106 until the sub-tokens expire.

At 502, an API session is initiated. It should be noted that an API session may include multiple API calls from the client device 102 to the application server 106.

At 504, the client device 102 sends a first API call of the API session to the application server 106. For a successful validation, the client device 102 should make the first API call including the first index T3 of the second sequence T3T1T2, the sub-token value of the index T3 i.e. 'GHI', the client ID, and other client authentication information.

At 506, the application server 106 communicates with the token server 104 to request validation of the first API call i.e. validation of the index T3. Validation of the index T3 herein includes validation of the sub-token value associated with the index T3 and also a validation of whether the index T3 is the first index in the second sequence stored with the token server 104 or not. For example, the token server 104 verifies if the index T3 is the first index of the cyclic token in conformity with the second sequential manner or not. As the token server 104 has stored T3T1T2 as the second sequence for the client device 102, and the application server 106 has sent the index T3 as the first index of the cyclic token, the token server 104 successfully validates the index T3 if the sub-token value received from the application server 106 is same as 'GHI'.

At 508, the application server 106 receives validation result or validation information of validation of the index T3 from the token server 104. At 509, the application server 106 informs the client device 102 of the successful validation of the sub-token and index of the sub-token provided by the client device 102 as part of the API call.

At 510, a subsequent API call i.e. the second API call is initiated by sending an API request to the application server 106 from the client device 102. The API call may include the second index T1 of the second sequence 'T3T1T2', the sub-token value of the index T1 i.e. 'ABC' and the client ID.

At 512, the application server 106 communicates with the token server 104 to request validation of the index T1. Validation of the index T1 herein refers to validation of the sub-token value associated with the index T1 and also a validation of whether the index T1 is the second index in the second sequence stored with the token server 104 or not. For example, the token server 104 verifies if the index T1 is the second index of the cyclic token in conformity with the second sequential manner or not. As the token server 104 has stored 'T3T1T2' as the second sequence for the client device 102, and the application server 106 has sent the index T1 as the second index of the cyclic token, the token server 104 validates the index T1 if the sub-token value received from the application server 106 is 'ABC'. At 514, the application server 106 receives validation result or validation information of validation of the index T1 from the token server 104. At 515, the application server 106 informs the client device 102 of the successful validation of the sub-token and index of the sub-token provided by the client device 102 as part of the API call.

At 516, another subsequent API call i.e. third API call is initiated by sending an API request to the application server 106 from the client device 102. The API call may include the third index T2 of the second sequence 'T3T1T2', the sub-token value of the index T2 i.e. 'DEF' and the client ID.

At 518, the application server 106 communicates with the token server 104 to request validation of the index T2. Validation of the index T2 herein refers to validation of the sub-token value associated with the index T2 and also a validation of whether the index T2 is the third index in the second sequence stored with the token server 104 or not. For example, the token server 104 verifies if the index T2 is the third index of the cyclic token in conformity with the second sequential manner or not. As the token server 104 has stored 'T3T1T2' as the second sequence for the client device 102, and if the application server 106 sends the index T2 as the third index, the token server 104 validates the index T2 if the sub-token value received from the application server 106 is 'DEF'.

At 520, the application server 106 receives validation result or validation information of validation of the index T2 from the token server 104. At 521, the application server 106 informs the client device 102 of the successful validation of the sub-token and index of the sub-token provided by the client device 102 as part of the API call. The application server 106 may inform the authentication notification to the client device 102 by a simple handshake message, or in form of text message or email.

In this manner, the application server 106 authenticates the client device 102 based on the validation information received from the token server 104.

It shall be noted that the process of API calls, and validation of API calls for authentication of the client device 102 may continue in cyclic fashion in an ongoing API session. For instance, in one API session there may be 'n' number of API calls, where 'n' can be any integral number. In an example, if there are 5 API calls in an API session, sub-tokens are used in a cyclic manner where one sub-token is consumed per API call. For instance, in this example, the sub-token of index T3 is used for validation of first API call, the sub-token of index T1 is used for validation of second API call, sub-token of index T2 is used for validation of third API call. It should be noted that for the validation of the fourth API call, the sub-token of index T3 is again consumed, and for the validation of the fifth API call, the sub-token of index T1 is again consumed. Hence, the second sequence (client sub-token sequence) i.e. 'T3T1T2' is used in cycle manner for the multiple API calls in a given API session. For example, as explained for 5 API calls, the sub-tokens are consumed in a sequence of 'T3T1T2T3T1'. Similarly, if there are 8 API calls in one API session, the sub-tokens may be used in a sequence of 'T3T1T2T3T1T2T3T1'. The indices of sub-tokens received in subsequent API calls will be maintained at the application server 106 for given session of client-server communication. It should also be noted that the token or the sub-tokens may have a validity time, and upon expiry of the token in one session or in multiple sessions, new cyclic tokens may need to be generated by the token server 104.

It should also be noted that if a current API session ends or a change in the API session is detected (e.g., the client device 102 and application server 104 starts a new API session), the client device 102 starts calling the API calls using sub-tokens from beginning of the cyclic token. For example, if in an API session S1, there are 7 API calls, the sub-tokens 'T3T1T2T3T1T2T3' are used as per the cyclic token. However, if the current API session S1 ends, and a new API session S2 of 4 API calls starts, the client device 102 makes the API calls using sub-tokens from beginning of the cyclic token i.e. in the order of 'T3T1T2 T3'.

It shall be appreciated that with an increase in the number of sub-tokens in a cyclic token, the complexity and level of security of the system increases as the client device 102 never shares the entire sub-token indices at its end to the application server 106 and the token server 104 over a single API call. Such non-sharing of sequence of sub-tokens, makes it difficult for unauthorized sources to intercept the entire token including sub-tokens in a particular sequence.

Figure 6:
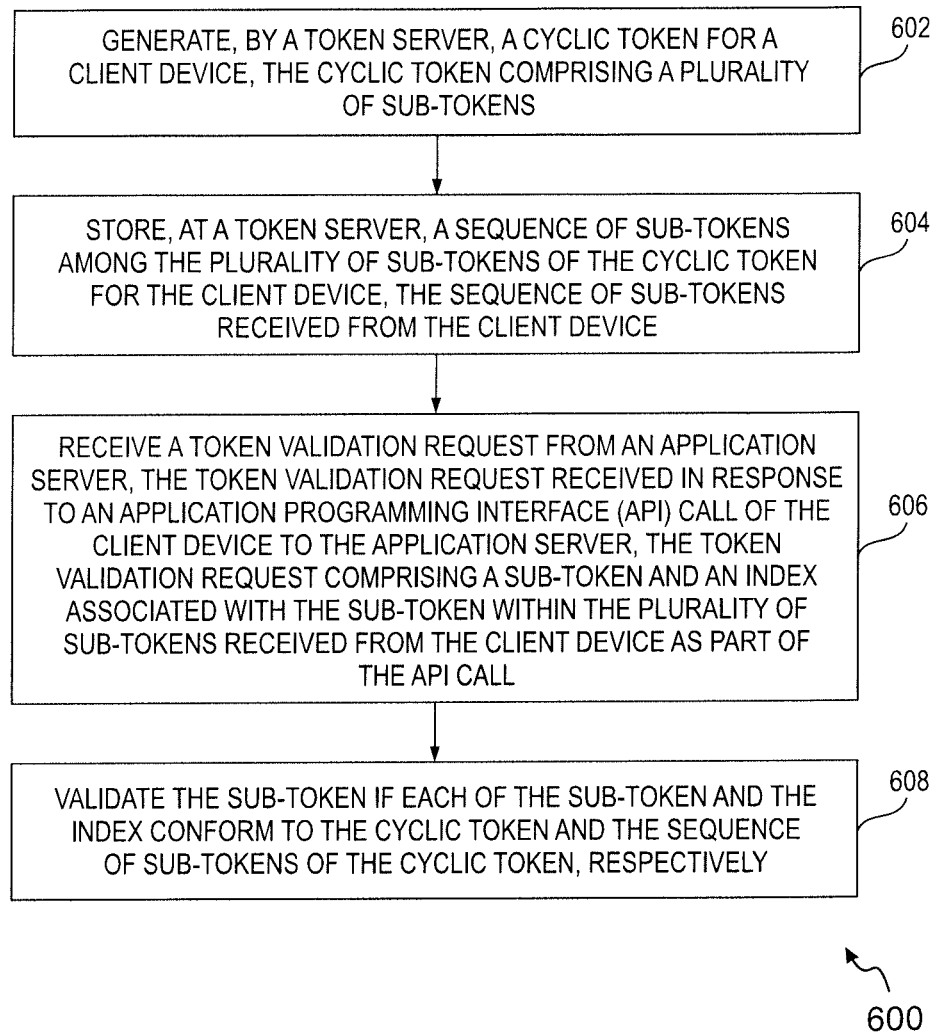
FIG. 6 illustrates a flow diagram of a method for facilitating a client-server communication using cyclic tokens, in accordance with another example embodiment of the present disclosure.

FIG. 6 illustrates a flow diagram of a method 600 for facilitating a client-server communication using cyclic token, in accordance with another example embodiment of the present disclosure.

At 602, the method 600 includes generating, by a token server, a cyclic token for a client device, where the cyclic token includes a plurality of sub-tokens. For example, the token server such as the token server 104 generates the cyclic token including a plurality of sub-tokens for the client device such as the client device 102.

At 604, the method 600 includes storing, at the token server, a sequence of sub-tokens among the plurality of sub-tokens of the cyclic token for the client device. It is noted that the sequence of sub-tokens is received from the client device in a sequential manner in a plurality of handshake messages (see, operations 414, 422 and 428 in FIG. 4).

At 606, the method 600 includes receiving a token validation request from an application server such as the application server 106. The token validation request may be received from the application server 106 in response to an API call of the client device to the application server. The token validation request includes a sub-token and an index associated with the sub-token within the plurality of sub-tokens received from the client device as part of the API call.

At 608, the method 600 includes validating a sub-token of the token validation request, if each of the sub-token and the index conforms (e.g., matches) to the cyclic token and the sequence of sub-tokens of the cyclic token, respectively. For instance, in an example, the sequence of sub-tokens of the cyclic token stored at the token server may be assumed to be T2T3T1, and the token is ABCDEFGHI with sub-tokens ABC with index T1, DEF with index T2 and GHI with index T3. In this example, the cyclic token should be DEF-GHI-ABC. In this example, if the client sends the sub-token DEF and the sub-token index T2 in the first API call, it will be considered to be in conformity (i.e. matching) with the cyclic token and the sequence of sub-tokens of the cyclic token, respectively. However, if the client sends the sub-token ABC and the sub-token index T2 in the first API call, it will not be considered to be in conformity with the cyclic token, and the sub-token ABC will not be validated by the token server.

Figures 7, 8A:
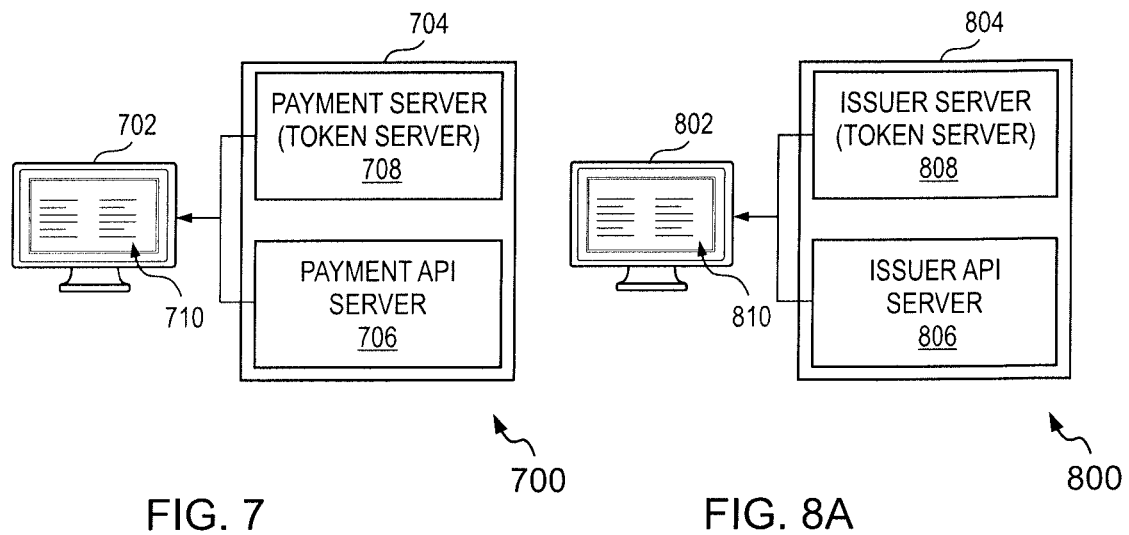
FIGS. 7, 8A and 8B illustrate simplified schematic representations displaying different configurations of a client device, a token server and an application server for facilitating client-server communication using cyclic token, in accordance with one embodiment of the present disclosure.
Figure 8B:
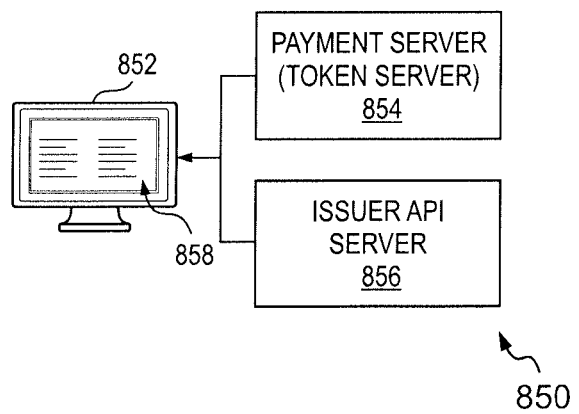

Some examples of use cases of the validation of API calls using cyclic token in payment transactions are explained herein with reference to FIGS. 7 and 8A-8B.

FIGS. 7 and 8A-8B illustrate simplified schematic representation 700, 800 and 850 respectively, displaying different configurations of a client device, a token server and an application server for facilitating client-server communication using cyclic token, in accordance with some embodiments of the present disclosure.

Referring to FIG. 7, a client device 702 and a server system 704 in operative communication for facilitating client-server communication using access tokens, are shown. As seen in FIG. 7, a token server 708 and a payment application server 706 are hosted/managed by the same entity i.e. payment cards issuing authorities or a payment interchange network (e.g., Mastercard® payment system interchange network). An application 710 hosted/managed by the payment application server 706 runs on the client device 702. In an example, the client device 702 may be an electronic device such as a smartphone of a user, and the application 710 may be a payment application such an application provided by Mastercard® or a digital wallet application. Further, the payment application server 706 can be a payment server of a payment network, and the token server 708 may be a server configured to generate tokens for services associated with the payment application server 706. By accessing the application 710 on the client device 702, a session may be established between the token server 708 and the client device 702 for generation of cyclic token including a plurality of sub-tokens and indices associated with the sub-tokens as per the second sequential manner. For example, as explained with reference to FIG. 4, the token server 708 generates a first sequence of indices and the client device 702 generates a second sequence of indices. Further, handshaking operations are performed for recording the second sequence of indices of sub-tokens and corresponding sub-tokens as the cyclic token in the token server 708. The cyclic token is further used for validation of API calls associated with the client device 102. For instance, when the client device 702 uses the application 710 for making the payment, the client device 702 sends the sub-tokens of the cyclic token in the second sequential manner (as explained with reference to FIG. 5) as part of one or more API calls, to the payment API server 606. The payment API server 706 further provides the received sub-tokens and indices of the sub-tokens to the token server 708. Thereafter, the token server 708 validates the one or more API calls for payment based on matching the sub-tokens and indices received from the payment API server 606 with the cyclic token recorded in the token server 708 for the client device 702.

Referring to FIG. 8A, a client device 802 and a server system 804 are in operative communication for facilitating client-server communication using access tokens. As seen in FIG. 8A, a token server 808 and an issuer application server 806 are hosted/managed by the same entity i.e. a financial institution or a bank. An application 810 hosted/managed by the issuer application server 806 runs on the client device 802. It shall be noted that by accessing the application 810, a session may be established between the token server 808 and the client device 802 for generation of cyclic token including a plurality of sub-tokens in an order as per the second sequential manner. The token server 808 (an example of the issuer server 808) further generates a first sequence of indices and the client device 802 generates a second sequence of indices. Further, handshaking operations are performed between the client device 802 and the token server 808 to establish the cyclic token. Once the cyclic token is established, sub-tokens of the cyclic token can be used by the client device 802 to make API calls as per the second sequence to the issuer application server 806.

Referring to FIG. 8B, a client device 852, a token server 854 and an issuer application server 856 are in operative communication for facilitating client-server communication using access tokens. As seen in FIG. 8B, the token server 854 is hosted/managed by a payment cards issuing authority as a payment interchange network and the issuer application server 856 is hosted/managed by a financial institution or a bank. An application 858 hosted/managed by the issuer application server 856 runs on the client device 852. It shall be noted that by accessing the application 858, a session may be established between the token server 854 and the client device 852 for generation of cyclic token including the plurality of sub-tokens in an order as per the second sequential manner. The token server 854 further generates a first sequence of indices and the client device 852 generates a second sequence of indices. Further, handshaking operations are performed between the client device 852 and the token server 854 to establish the cyclic token. Once the cyclic token is established, sub-tokens of the cyclic token can be used by the client device 852 to make API calls as per the second sequence to the issuer application server 856.

Figure 9:
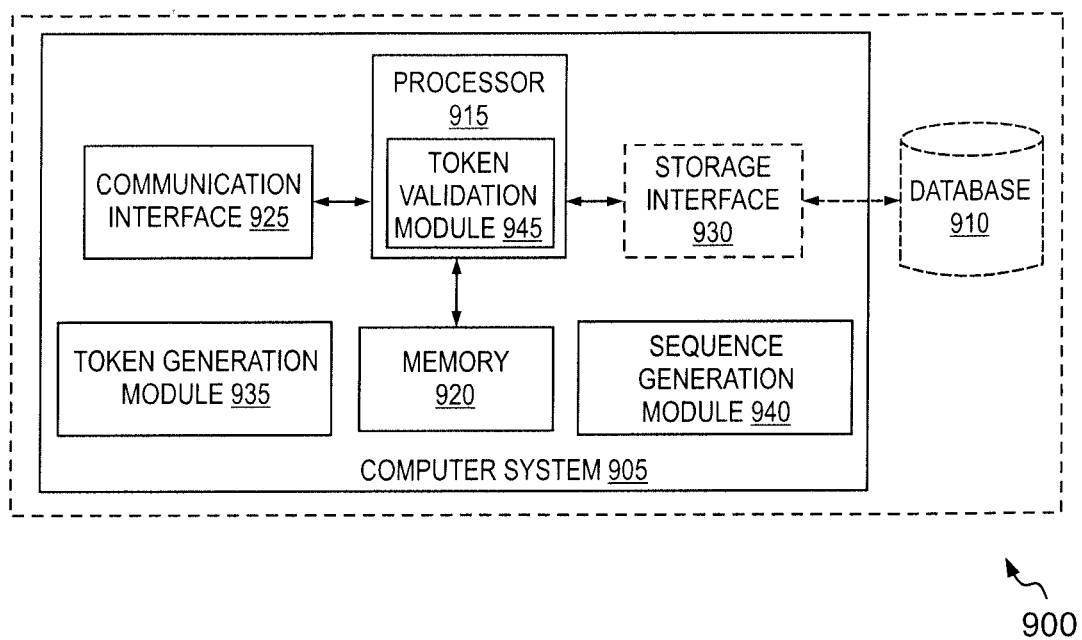
FIG. 9 is a simplified block diagram of a server system, in accordance with one embodiment of the present disclosure.

FIG. 9 is a simplified block diagram of a server system 900, in accordance with one embodiment of the present disclosure. The server system 900 is an example of the token server 104 of FIG. 1. The server system 900 includes a computer system 905 and a database 910. The computer system 905 includes a processor 915 for executing instructions. Instructions may be stored in, for example, but not limited to, a memory 920. The processor 915 may include one or more processing units (e.g., in a multi-core configuration). The processor 915 is operatively coupled to a communication interface 925 such that the computer system 905 can communicate with the client device 102. For example, the communication interface 925 may receive the token generation request from the client device 102.

The processor 915 may also be operatively coupled to the database 910. The database 910 is any computer-operated hardware suitable for storing and/or retrieving data. The database 910 may include multiple storage units such as hard disks and/or solid-state disks in a redundant array of inexpensive disks (RAID) configuration. The database 910 may include, but not limited to, a storage area network (SAN) and/or a network attached storage (NAS) system. In some embodiments, the database 910 is integrated within the computer system 905. For example, the computer system 905 may include one or more hard disk drives as the database 910. In other embodiments, the database 910 is external to the computer system 905 and may be accessed by the computer system 905 using a storage interface 930. The storage interface 930 is any component capable of providing the processor 915 with access to the database 910. The storage interface 930 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 915 with access to the database 910.

The computer system 905 further includes a token generation module 935. The token generation module 935 may be configured to generate tokens and sub-tokens. The token generation module 935 may break or divide a token into a random or a pre-defined number of sub-tokens based on an algorithm. The random or pre-defined number is at least 2. In an example, a token 'ABCDEFGHI' may be divided into 3 sub-tokens as, 'ABC', 'DEF' and 'GHI'. In another example, the token 'ABCDEFGHI' may be divided into 4 sub-tokens as, 'ABC', 'DE' and 'FG' and 'HI'. The token generation module 935 may further receive instructions to generate indices equal in number to the sub-tokens and associate each sub-token generated from the token with an index. In the first example, each of the sub-tokens 'ABC', 'DEF' and 'GHI' are associated with an index T1, T2 and T3 respectively.

The computer system 905 further includes a sequence generator module 940. The sequence generator module 940 may receive instructions from the processor 915 to generate random sequences of the indices of the sub-tokens. The computer system 905 is configured to record each of the indices of sub-tokens received from an external device such as the client device 102, and is configured to store the cyclic token for the client device 102 in a storage location such as the memory 920. The processor 915 includes a token validation module 945 that is configured to perform a validation of the API calls based on sub-tokens of the cyclic token received form an application server such as the application server 106.

Figure 10:
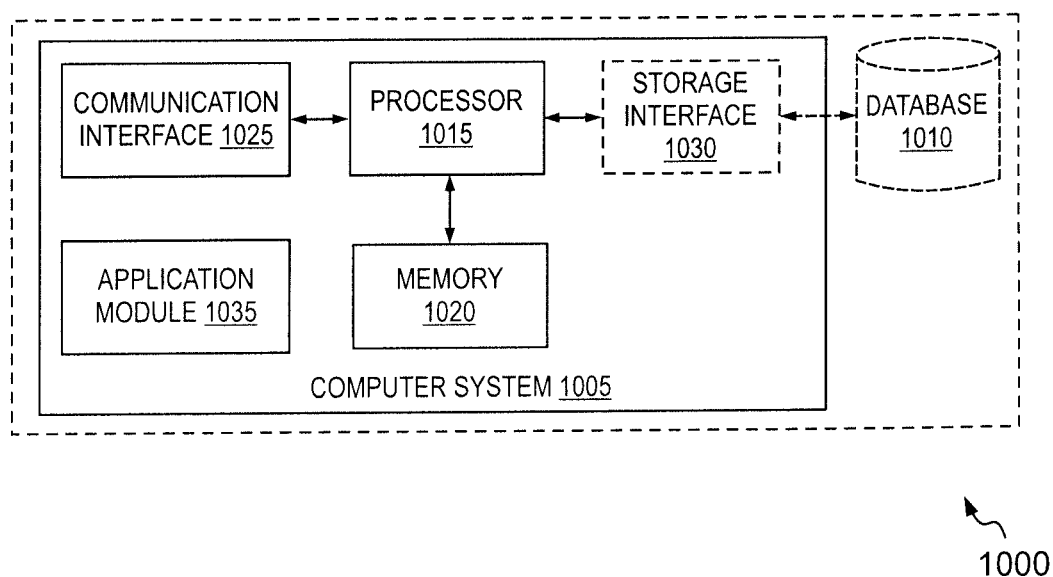
FIG. 10 is a simplified block diagram of another server system, in accordance with one embodiment of the present disclosure.

FIG. 10 is a simplified block diagram of another server system 1000, in accordance with one embodiment of the present disclosure. The server system 1000 is an example of the application server 106 of FIG. 1. The server system 1000 includes a computer system 1005 and a database 1010. The computer system 1005 includes a processor 1015 for executing instructions. Instructions may be stored in, for example, but not limited to, a memory 1020. The processor 1015 may include one or more processing units (e.g., in a multi-core configuration). The processor 1015 is operatively coupled to a communication interface 1025 such that the computer system 1005 can communicate with the client device 102 as well as the token server 104. For example, the communication interface 1025 may receive the token generation request from the client device 102.

The processor 1015 may also be operatively coupled to the database 1010. The database 1010 is any computer-operated hardware suitable for storing and/or retrieving data. The database 1010 may include multiple storage units such as hard disks and/or solid-state disks in a redundant array of inexpensive disks (RAID) configuration. The database 1010 may include, but not limited to, a storage area network (SAN) and/or a network attached storage (NAS) system. In some embodiments, the database 1010 is integrated within the computer system 1005. For example, the computer system 1005 may include one or more hard disk drives as the database 1010. In other embodiments, the database 1010 is external to the computer system 1005 and may be accessed by the computer system 1005 using a storage interface 1030. The storage interface 1030 is any component capable of providing the processor 1015 with access to the database 1010. The storage interface 1030 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1015 with access to the database 1010.

The computer system 1005 further includes an application module 1035. The application module 1035 is configured to implement features of the application on the client device 102 upon installation. As an example, the application may be a payment transaction application. The application module 1035 may be configured to receive payment transaction related information and user information from the client device 102. The application module 1035 further sends response to the payment transaction related information and the user information to the client device 102.

The application module 1035 may be configured to enable the client device 102 to generate tokens and sub-tokens at the client end. The application module 1035 may be configured to enable the client device 102 to generate indices equal in number to the sub-tokens and associate each sub-token with an index at the client end.

Figure 11:
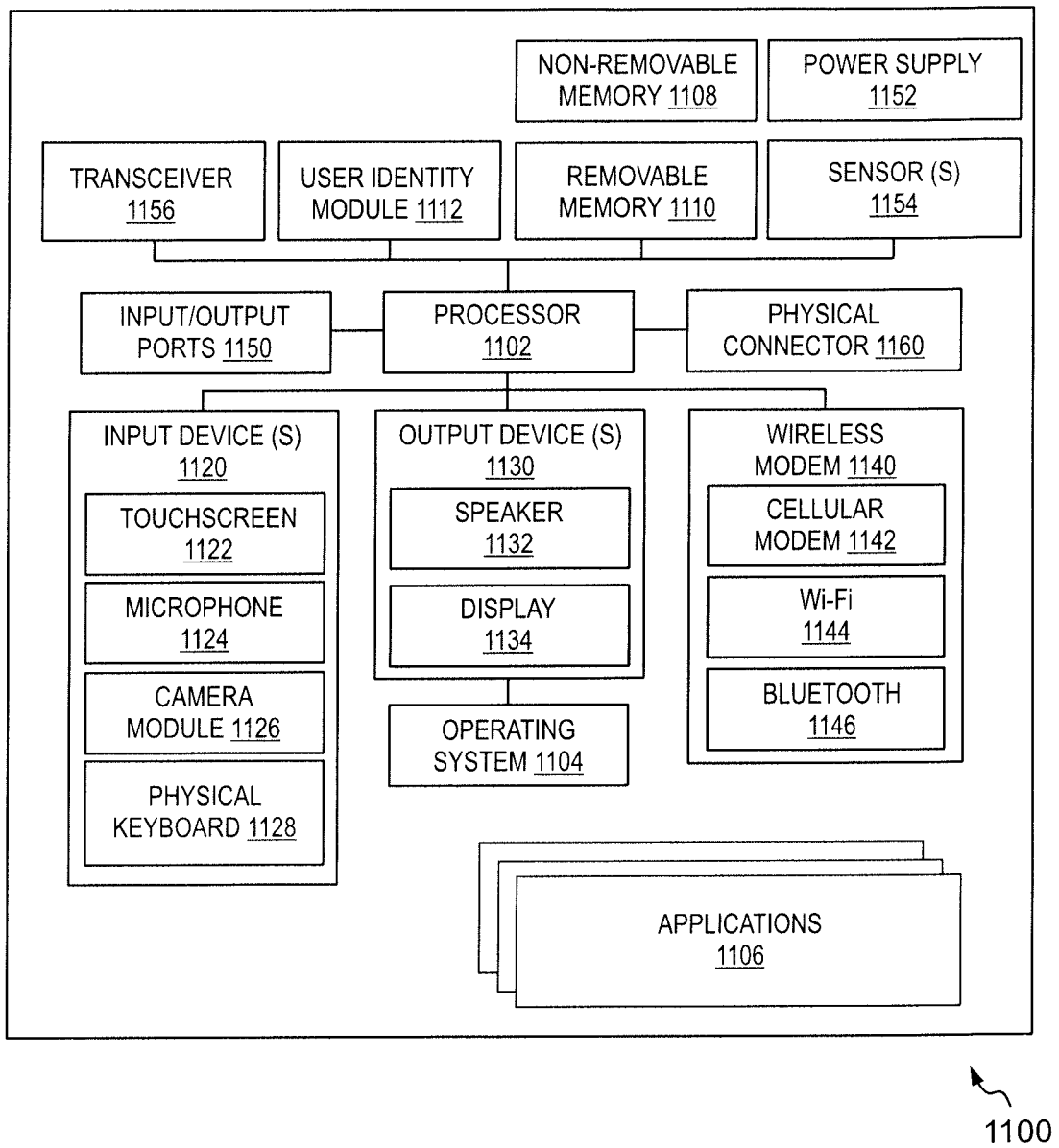
FIG. 11 shows simplified block diagram of a user device, such as the client device, in accordance with one embodiment of the present disclosure.

FIG. 11 shows simplified block diagram of a user device 1100, such as the client device 102 of FIG. 1. The user device 1100, for example, can be a desktop computer or a mobile phone capable of implementing the various embodiments of the present disclosure. The user device 1100 is depicted to includes applications 1106.

It should be understood that the user device 1100 as illustrated and hereinafter described is merely illustrative of one type of device and should not be taken to limit the scope of the embodiments. As such, it should be appreciated that at least some of the components described below in connection with that the user device 1100 may be optional and thus in an example embodiment may include more, less or different components than those described in connection with the example embodiment of the FIG. 11. As such, among other examples, the user device 1100 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the user device 1100 and support for one or more applications programs (see, the applications 1106), that implements one or more of the innovative features described herein. The applications 1106 may include payment based applications and/or any common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1100 includes one or more memory components, for example, a non-removable memory 1108 and/or a removable memory 1110. The non-removable memory 1108 and/or the removable memory 1110 may be collectively known as database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The user device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the user device 1100 and a public switched telephone network (PSTN).

The user device 1100 can further include one or more input/output ports 1150 for establishing connection with peripheral devices including a power supply 1152, one or more sensors 1154 for example, an accelerometer, a gyroscope, a compass, or an infrared proximity sensor for detecting the orientation or motion of the user device 1100 and biometric sensors for scanning biometric identity of an authorized user, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

The disclosed methods with reference to FIGS. 1 to 11 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 900 (e.g., payment server) various components such as the computer system 905 and the database 910 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Without in any way limiting the scope, interpretation, or application of the claims appearing below, a technical effect of one or more of the example embodiments disclosed herein is to provide computer implemented methods and server systems for facilitating a client-server communication using cyclic tokens. Various embodiments provide a token server for generating a cyclic token, where the cyclic token includes a plurality of sub-tokens arranged in a particular order, where sub-tokens are is used in a cyclic manner for API calls. During generation of the cyclic token, and in an API call, the client device never shares the entire list of sub-token indices at its end to the token server or the application server over a single API call, thus making the authentication process very secure. Moreover, the complexity and level of security imposed by proposed solution increases as number of sub-token increases.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method for facilitating a client-server communication using cyclic tokens, the method comprising:
   receiving, by a token server, a request for token generation from a client device;
   generating a token in response to the request for token generation;
   sending, the token and a number of sub-tokens to be formed from the token, by the token server to the client device;
   establishing a cyclic token by the token server for the client device, wherein establishing comprises
      generating a plurality of sub-tokens from the token based on the number of sub-tokens, each sub-token of the plurality of sub-tokens associated with an index within the token,
      sending a first sequence of indices of sub-tokens to the client device in a first sequential manner, the first sequence of indices of sub-tokens defined at the token server,
      receiving a second sequence of indices of sub-tokens from the client device in a second sequential manner, the second sequence of indices of sub-tokens defined at the client device,
      sending the plurality of sub-tokens of the token to the client device in an order defined by the second sequence, and recording the plurality of sub-tokens in an order defined by the second sequential manner as the cyclic token; and facilitating validation of the cyclic token upon receipt of a token validation request from an application server for an Application Programming Interface (API) call of the client device to the application server based at least on the plurality of sub-tokens in the second sequential manner.

2. The method as claimed in claim 1, wherein establishing further comprises:
defining the first sequence of indices of sub-tokens by the token server; and
facilitating the client device to define the second sequence of indices of sub-tokens.

3. The method as claimed in claim 1, further comprising receiving, by the token server, an approval from the client device of the number of sub-tokens to be formed from the token, wherein the number of sub-tokens is at least 2.

4. The method as claimed in claim 1, wherein facilitating validation of the cyclic token comprises:
receiving a sub-token and an index associated with the sub-token as part of the token validation request from the application server, wherein the application server receives the API call from the client device, the API call comprising the sub-token of the cyclic token and the index associated with the sub-token;
matching the sub-token and the index with corresponding sub-token of the cyclic token and corresponding index recorded by the token server as part of the cyclic token, respectively, in the second sequential manner; and
upon successful matching, validating the sub-token of the token validation request.

5. The method as claimed in claim 1, wherein the plurality of sub-tokens of the cyclic token are used for a plurality of API calls in a cyclic manner, wherein the plurality of API calls belongs to a single API session.

6. The method as claimed in claim 5, wherein if a current API session ends and the API call belongs to a new API session, facilitating validation further comprises using the plurality of sub-tokens of the cyclic token from beginning in the second sequential manner.

7. The method as claimed in claim 1, wherein sending the plurality of sub-tokens of the token to the client device in an order defined by the second sequence comprises:
sending a sub-token associated with a first index of the second sequence of indices to the client device in response to receipt of the first index from the client device;
sending a sub-token associated with a second index of the second sequence of indices to the client device in response to receipt of the second index from the client device.

8. The method as claimed in claim 1, further comprising sending the number of sub-tokens to be formed from the token to the client device in at least one of:
an offline manner; and
in a session different than a session in which the token is sent from the token server to the client device.

9. The method as claimed in claim 1, further comprising:
receiving a sequence of indices of sub-tokens as received from the token server from the client device, the sequence of indices of sub-tokens received upon completion of sending the first sequence of indices of sub-tokens to the client device by the token server; and
matching the sequence of indices of sub-tokens with the first sequence of indices of sub-tokens to validate if the client device has correctly recorded the first sequence of indices of sub-tokens in the first sequential manner.

10. The method as claimed in claim 1, wherein the request for token generation comprises a valid client ID and client authentication information.

11. The method as claimed in claim 1, further comprising facilitating authentication of the client device for the API call by the application server upon successful validation of the cyclic token.

12. A token server for facilitating a client-server communication using a cyclic token, the token server comprising:
a memory comprising stored instructions; and
a processor configured to execute the stored instructions and thereby cause the token server to perform a method comprising
receiving a request for token generation from a client device,
generating a token in response to the request for token generation,
sending, the token and a number of sub-tokens to be formed from the token, by the token server to the client device,
establishing a cyclic token by the token server for the client device, wherein establishing comprises
generating a plurality of sub-tokens from the token based on the number of sub-tokens, each sub-token of the plurality of sub-tokens associated with an index within the token,
sending a first sequence of indices of sub-tokens to the client device in a first sequential manner, the first sequence of indices of sub-tokens defined at the token server,
receiving a second sequence of indices of sub-tokens from the client device in a second sequential manner, the second sequence of indices of sub-tokens defined at the client device,
sending the plurality of sub-tokens of the token to the client device in an order defined by the second sequence, and
recording the plurality of sub-tokens in an order defined by the second sequential manner as the cyclic token, and
facilitating validation of the cyclic token upon receipt of a token validation request from an application server for an Application Programming Interface (API) call of the client device to the application server based at least on the plurality of sub-tokens in the second sequential manner.

13. The token server as claimed in claim 12, wherein the token server is further caused to receive an approval from the client device of the number of sub-tokens to be formed from the token, wherein the number of sub-tokens is at least 2.

14. The token server as claimed in claim 12, wherein for facilitating validation of the cyclic token, the token server is further caused at least in part to:
receive a sub-token and an index associated with the sub-token as part of the token validation request from the application server, wherein the application server receives the API call from the client device, the API call comprising the sub-token of the cyclic token and the index associated with the sub-token;
match the sub-token and the index with corresponding sub-token of the cyclic token and corresponding index recorded by the token server as part of the cyclic token, respectively, in the second sequential manner; and upon successful matching, validate the sub-token of the token validation request.

15. The token server as claimed in claim 12, wherein the plurality of sub-tokens of the cyclic token are used for a plurality of API calls in a cyclic manner, wherein the plurality of API calls belongs to a single API session.

16. The token server as claimed in claim 15, wherein if a current API session ends and the API call belongs to a new API session, facilitating validation further comprises using the plurality of sub-tokens of the cyclic token from beginning in the second sequential manner.

17. The token server as claimed in claim 12, wherein the token server is further caused at least in part to send the number of sub-tokens to be formed from the token to the client device in at least one of:

an offline manner; and in a session different than a session in which the token is sent from the token server to the client device.

18. A method, comprising:

generating, by a token server, a cyclic token for a client device, the cyclic token comprising a plurality of sub-tokens;

storing, at a token server, a sequence of sub-tokens among the plurality of sub-tokens of the cyclic token for the client device, the sequence of sub-tokens received from the client device;

receiving a token validation request from an application server, the token validation request received in response to an Application Programming Interface (API) call of the client device to the application server, the token validation request comprising a sub-token and an index associated with the sub-token within the plurality of sub-tokens received from the client device as part of the API call; and validating the sub-token if each of the sub-token and the index conform to the cyclic token and the sequence of sub-tokens of the cyclic token, respectively.

19. The method as claimed in claim 18, wherein the sequence of sub-tokens are received from the client device in a plurality of handshake messages, wherein in each handshake message one index of a sub-token of the plurality of sub-tokens of the cyclic token is received.

20. The method as claimed in claim 18, wherein the plurality of sub-tokens of the cyclic token are used for a plurality of API calls in a cyclic manner, wherein the plurality of API calls belongs to a single API session.

\* \* \* \* \*